United States Patent
Yu

(10) Patent No.: US 10,139,051 B2
(45) Date of Patent: Nov. 27, 2018

(54) REPLACEABLE LED LAMP

(71) Applicant: SHENZHEN YAORONG TECHNOLOGY CO.,LTD, Shenzhen, Guangdong Province (CN)

(72) Inventor: Huanhuan Yu, Shenzhen (CN)

(73) Assignee: Shenzhen Yaorong Technology Co., Ltd. (CN)

( * ) Notice: Subject to any disclaimer, the term of this patent is extended or adjusted under 35 U.S.C. 154(b) by 109 days.

(21) Appl. No.: 15/317,941

(22) PCT Filed: May 27, 2016

(86) PCT No.: PCT/CN2016/083595
§ 371 (c)(1),
(2) Date: Dec. 11, 2016

(87) PCT Pub. No.: WO2017/117905
PCT Pub. Date: Jul. 13, 2017

(65) Prior Publication Data
US 2018/0187838 A1    Jul. 5, 2018

(30) Foreign Application Priority Data

Jan. 9, 2016 (CN) .................... 2016 2 0015224 U

(51) Int. Cl.
| | | |
|---|---|---|
| *F21K 9/20* | (2016.01) | |
| *F21V 17/16* | (2006.01) | |
| *F21K 9/61* | (2016.01) | |
| *F21V 3/00* | (2015.01) | |
| *F21V 19/00* | (2006.01) | |
| *F21V 8/00* | (2006.01) | |
| *F21V 19/04* | (2006.01) | |
| *F21Y 115/10* | (2016.01) | |
| *F21Y 105/00* | (2016.01) | |

(52) U.S. Cl.
CPC .................. *F21K 9/20* (2016.08); *F21K 9/61* (2016.08); *F21V 3/00* (2013.01); *F21V 19/001* (2013.01); *F21V 19/04* (2013.01); *G02B 6/0051* (2013.01); *G02B 6/0055* (2013.01); *F21Y 2105/00* (2013.01); *F21Y 2115/10* (2016.08)

(58) Field of Classification Search
CPC ........... F21K 9/20; F21K 9/61; G02B 6/0051; G02B 6/0055; F21V 19/001; F21V 3/00
See application file for complete search history.

(56) References Cited

U.S. PATENT DOCUMENTS

2015/0103558 A1*    4/2015    Fobbe .................. G02B 6/0081
                                                                        362/612

* cited by examiner

*Primary Examiner* — Thomas M Sember
(74) *Attorney, Agent, or Firm* — PROI Intellectual Property US

(57) ABSTRACT

The present invention relates to a replaceable LED lamp, which comprises a mounting base grid for fixing a replaceable LED lamp on a mounting surface, an LED light source main body for lighting and illuminating, and a clamping piece, wherein the clamping piece fixes the LED light source main body on the mounting base grid by clamping with an elastic structure fixed on the LED light source main body. Through the clamping fit between the elastic structure on the LED light source main body and the clamping piece, the present invention allows a new LED lamp to be mounted on an old lamp base easily and feasibly with convenient and quick operation, thereby reducing the labor cost of replacing the LED lamp, reducing the number of assembly parts of the new lamp and reducing the material cost of replacement.

7 Claims, 5 Drawing Sheets

REPLACEABLE LED LAMP

CROSS REFERENCE TO RELATED APPLICATIONS

The present application is the US national stage of International Patent Application PCT/CN2016/083595 filed on May 27, 2016, which, in turn, claims priority to Chinese Patent Application CN 201620015224.4 filed on Jan. 9, 2016.

BACKGROUND

Technical Field

The present invention pertains to the technical field of LED lamps, and specifically relates to a replaceable LED lamp.

Related Art

There are various styles of lamps in existing technologies and users often replace lamps with new ones; when replacing a lamp, a user often needs to take down the lampshade and base in turn before mounting a new base, a new lamp and a new lampshade; however, demounting the base often involves the connection fit with an mounting surface, and thus is labor consuming and time consuming.

SUMMARY

The technical problem to be solved by the present invention is to provide a replaceable LED lamp, so as to avoid the above mentioned defect in existing technologies that the replacement of LED lamps is labor consuming and time consuming; the replaceable LED lamp is designed with a clamping piece fit with an elastic structure on an LED light source main body such that the mounting of new LED lamps becomes simple and feasible and the material cost of new LED lamps is reduced.

The technical scheme adopted by the present invention to solve the technical problem is a replaceable LED lamp, comprising a mounting base grid for fixing a replaceable LED lamp on a mounting surface, an LED light source main body for lighting and illuminating, and a clamping piece; the clamping piece fixes the LED light source main body on the mounting base grid by clamping with an elastic structure fixed on the LED light source main body.

The LED light source main body is an LED light source main body with side lighting, comprising a profile bracket enclosing the surrounding thereof and an LED light source plate equipped with LED lamp beads; the profile bracket comprises a bracket top face, a bracket bottom face, and a bracket vertical face connecting the bracket top face and the bracket bottom face; one end of the elastic structure is fixed on the bracket top face; one side of the bracket bottom face and the bracket top face are up-down clamped to form a clamping groove to accommodate the LED light source plate; and the other side of the bracket bottom face is attached onto the clamping piece.

The LED light source main body comprises a light guide plate, a light reflecting plate and a light diffusion plate that are clamped in the clamping groove in turn from top down; the light reflecting plate and the light diffusion plate are disposed on the upper and lower sides of the light guide plate respectively to reflect and diffuse the light of the LED light source respectively.

The clamping piece is an elastic sheet with a Z-shaped section, comprising a clamping piece top face for clamping the clamping piece under the elastic structure, a clamping piece vertical face for attaching onto the LED light source main body, and a clamping piece bottom face for attaching onto the mounting base grid and the LED light source main body; by means of the clamping piece vertical face and the clamping piece bottom face, the clamping piece is attached onto the LED light source main body and the mounting base grid; and, by clamping the clamping piece top face between the elastic sheet of the elastic structure and the LED light source main body, the LED light source main body is fixedly connected to the mounting base grid via the clamping piece.

The replaceable LED lamp further comprises a lampshade for covering the LED light source main body; the clamping piece is a tailed-Z-shaped elastic sheet, comprising a clamping piece top face for clamping the clamping piece under the elastic structure, a clamping piece vertical face for attaching the clamping piece onto the LED light source main body, a clamping piece bottom face for attaching the clamping piece onto the mounting base grid and the LED light source main body, and a clamping piece tail clamped between the lampshade and the mounting base grid; by means of the clamping piece vertical face and the clamping piece bottom face, the clamping piece is attached onto the LED light source main body and the mounting base grid; and, by clamping the clamping piece top face between the elastic sheet of the elastic structure and the LED light source main body, the LED light source main body is fixedly connected to the mounting base grid via the clamping piece; and the clamping piece tail makes the lampshade fixedly connected to the mounting base grid by being clamped between the lampshade and the mounting base grid.

The elastic sheet in the elastic structure is shaped like an inverted U or V, one end of the elastic structure is fixedly connected to the LED light source main body and the other end thereof is used for clamping the clamping piece onto the LED light source main body.

There are at least two groups of elastic structures, each of which has at least one elastic sheet respectively and is located on each side of the LED light source main body respectively; there are at least two clamping pieces, the number of which is the same as the group number of elastic structures; and each clamping piece is clamped with one group of elastic structures.

The replaceable LED lamp further comprises a lampshade for covering the LED light source main body, and the lampshade is fixedly connected to the mounting base grid.

Compared with existing technologies, the present invention has benefits as follows: 1. through the fit between the elastic structure on the LED light source main body with side lighting and the clamping piece, the mounting of a new LED lamp on an old lamp base becomes simple and feasible, the operation is convenient and quick, and the labor cost of replacing the LED lamp is reduced; 2. the design of the above LED lamp improves the compatibility of mounting, such that the number of assembly parts of the new lamp is reduced and the material cost of replacement is reduced.

DESCRIPTION OF EMBODIMENTS

Specific embodiments of the present invention are described below in more detail in conjunction with each accompanying drawing.

Figure 1:
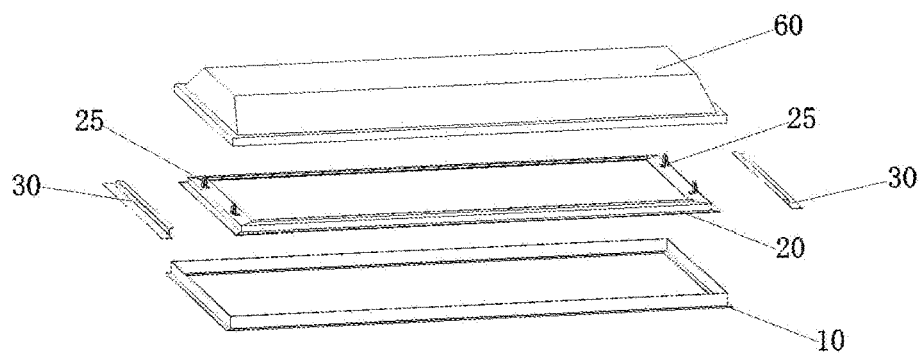
FIG. 1 is an exploded axonometric projection diagram of a preferred embodiment of the present invention.
Figure 2:
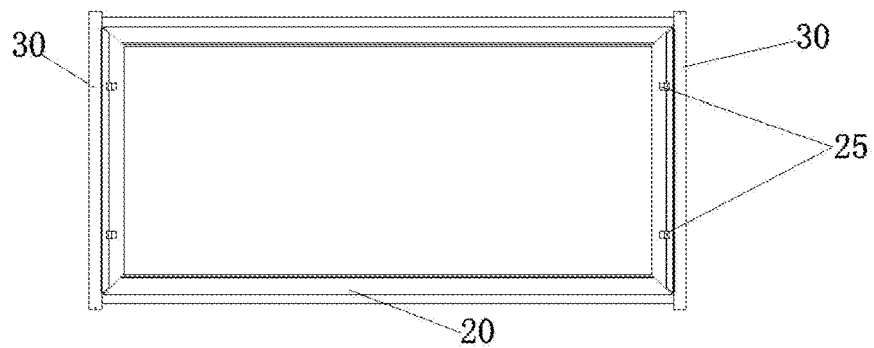
FIG. 2 is a front bottom view of an assembly state of a preferred embodiment of the present invention with lampshade 60 removed.
Figure 3:
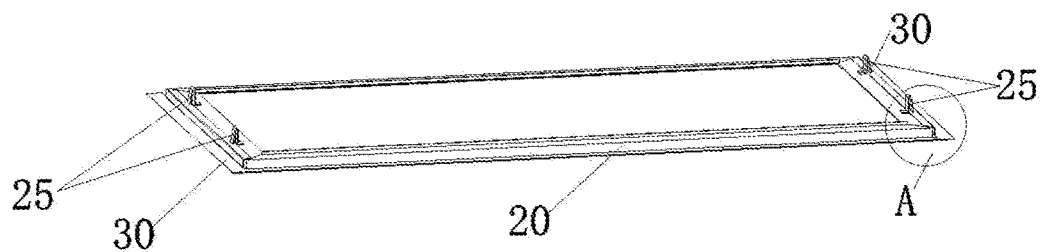
FIG. 3 is an axonometric projection diagram of an assembly state of an LED light source main body 20.

In a preferred embodiment of a replaceable LED lamp as shown in FIG. 1, the replaceable LED lamp comprises a mounting base grid 10 for fixing a replaceable LED lamp on a mounting surface, an LED light source main body 20 for lighting and illuminating, and a clamping piece 30; and the clamping piece 30 fixes the LED light source main body 20 on the mounting base grid 10 by clamping with an elastic structure 25 fixed on the LED light source main body 20.

In the preferred embodiment of the replaceable LED lamp as shown in FIG. 5 to FIG. 10, the LED light source main body 20 is an LED light source main body with side lighting, comprising a profile bracket 50 enclosing the surrounding thereof and an LED light source plate 26 equipped with LED lamp beads.

Figure 6:
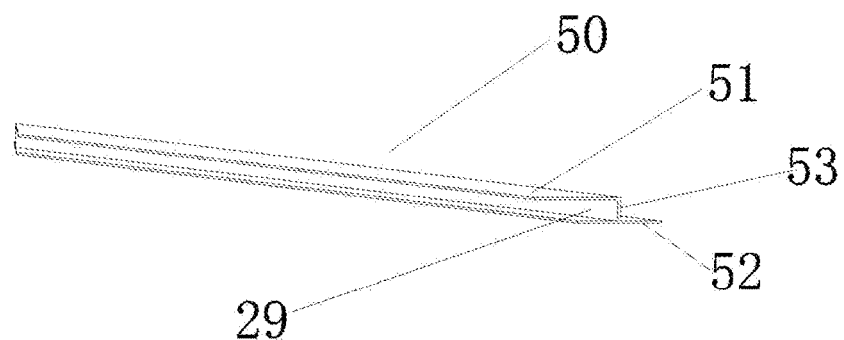
FIG. 6 is an axonometric projection diagram of a profile bracket 50.
Figure 7:
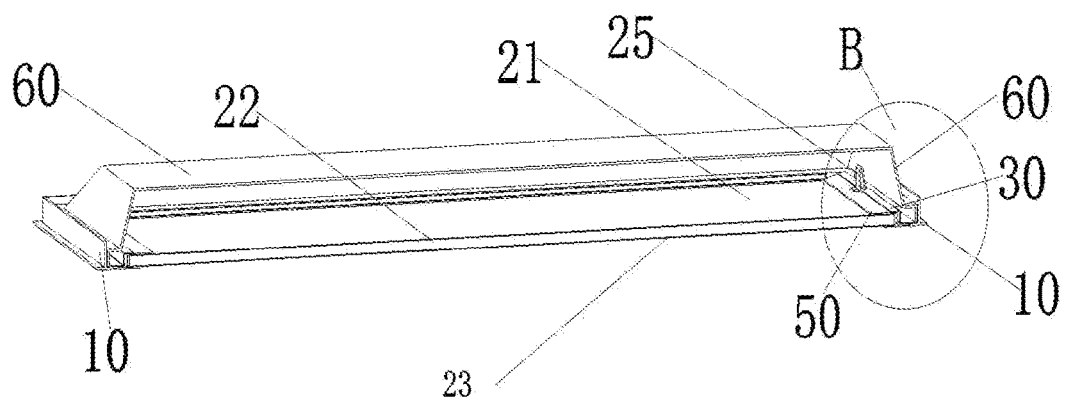
FIG. 7 is a cross-sectional axonometric projection diagram of a preferred embodiment of the present invention, with LED light source plate 26 omitted.

As shown in FIG. 6 and FIG. 7, the profile bracket 50 comprises a bracket top face 51, a bracket bottom face 52, and a bracket vertical face 53 connecting the bracket top face 51 and the bracket bottom face 52; one end of the elastic structure 25 is fixed on the bracket top face 51; one side of the bracket bottom face 52 and the bracket top face 51 are up-down clamped to form a clamping groove 29 to accommodate the LED light source plate 26.

As shown in FIG. 6 to FIG. 10, the LED light source plate 26 is placed in the clamping groove 29, attached onto the bracket vertical face 53, with a light-emitting surface facing the opening direction of the clamping groove 29; the LED light source plate 26, together with the profile bracket 50, is enclosed to form an LED light source main body 20 with side lighting. The other side of the bracket bottom face 52 is attached onto the clamping piece 30; the LED light source main body 20 elastically clamps, via the elastic structure 25, the clamping piece 30 on the bracket bottom face 52 of the profile bracket 50.

As shown in FIG. 6 to FIG. 10, the profile bracket 50 is in a long-bar shape and is enclosed to form a rectangular LED light source main body 20; the LED light source main body 20 comprises a light guide plate 21, a light reflecting plate 22 and a light diffusion plate 23 that are clamped in the clamping groove 29 in turn from top down; the light reflecting plate 22 and the light diffusion plate 23 are disposed on the upper and lower sides of the light guide plate 21 respectively to reflect and diffuse the light of the LED light source respectively.

Figure 4:
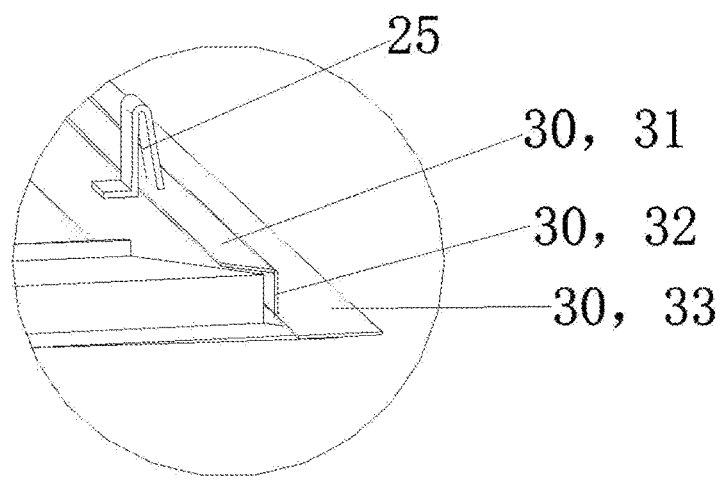
FIG. 4 is an enlarged view of part A in FIG. 3.
Figure 5:
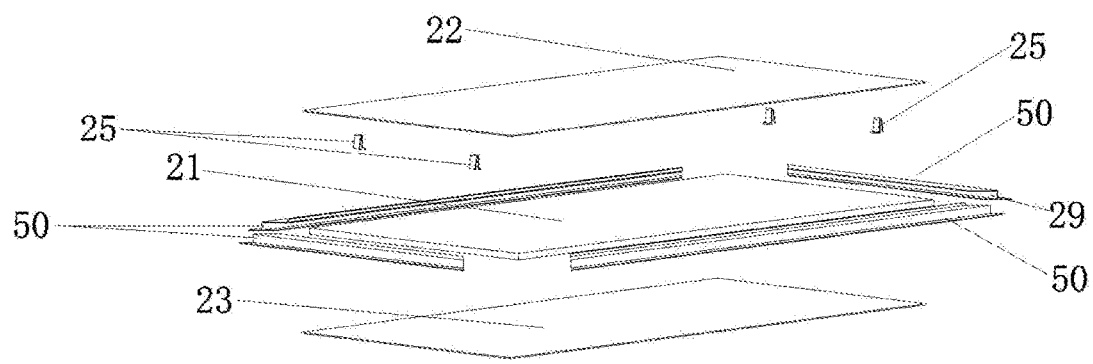
FIG. 5 is an exploded axonometric projection diagram of an LED light source main body 20.

In the embodiment as shown in FIG. 4, the clamping piece 30 is an elastic sheet with a Z-shaped section, comprising a clamping piece top face 31 for clamping the clamping piece 30 under the elastic structure 25, a clamping piece vertical face 32 for attaching the clamping piece 30 onto the LED light source main body 20, and a clamping piece bottom face 33 for attaching the clamping piece 30 onto the mounting base grid 10 and the LED light source main body 20, wherein, by means of the clamping piece vertical face 32 and the clamping piece bottom face 33, the clamping piece 30 is attached onto the LED light source main body 20 and the mounting base grid 10; and, by clamping the clamping piece top face 31 between the elastic sheet of the elastic structure 25 and the LED light source main body 20, the LED light source main body 20 is fixedly connected to the mounting base grid 10 via the clamping piece 30.

Figure 8:
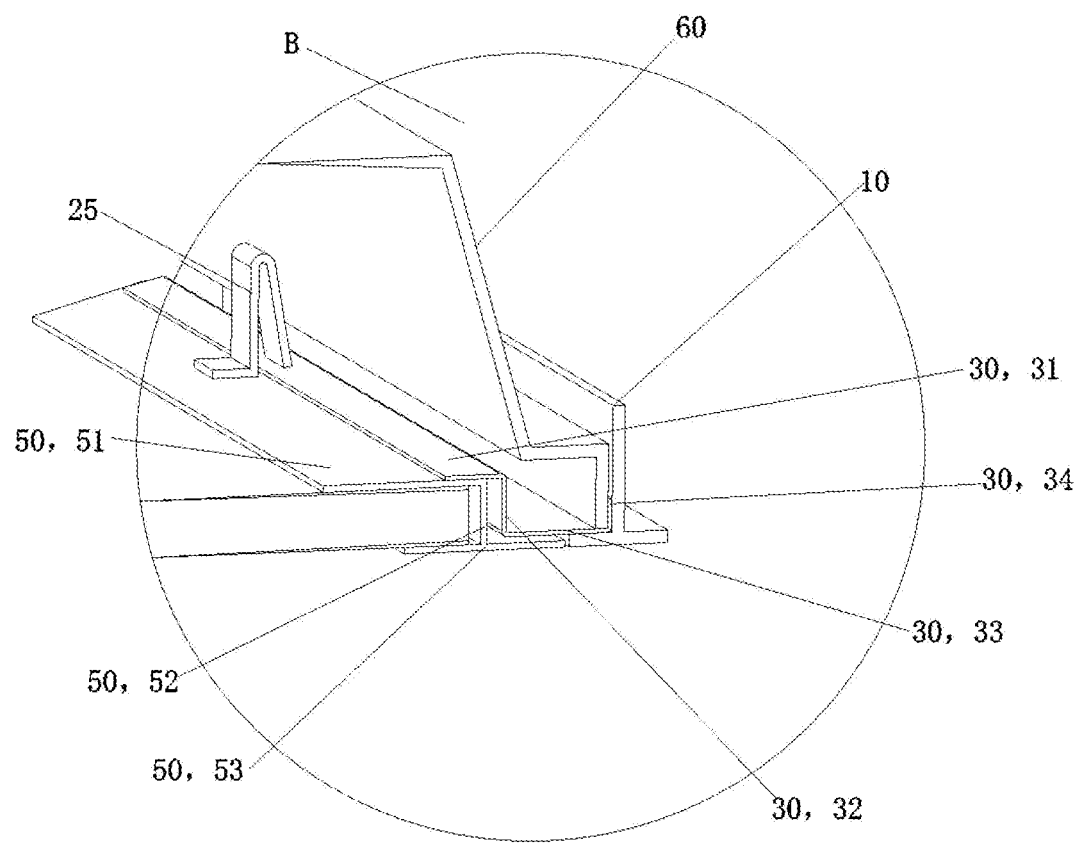
FIG. 8 is an enlarged view of part B in FIG. 7.
Figure 9:
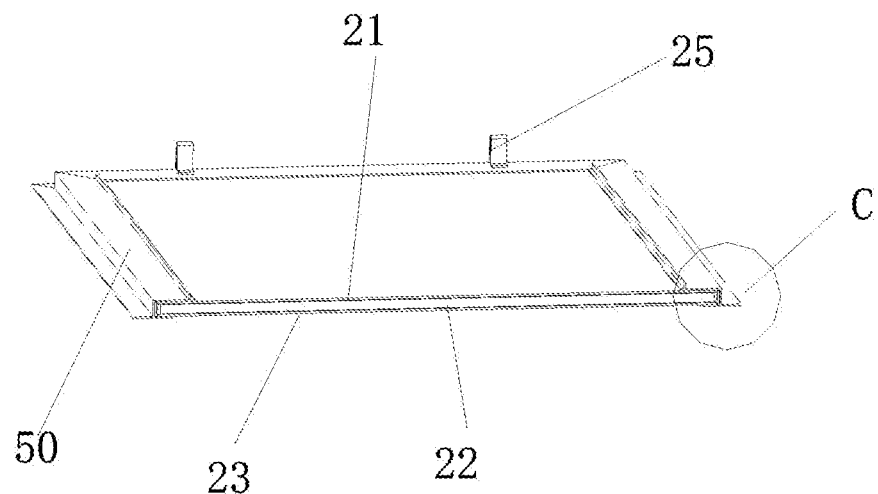
FIG. 9 is a longitudinal-sectional axonometric projection diagram of a preferred embodiment of the present invention, with lampshade 60 and mounting base grid 10 omitted.
Figure 10:
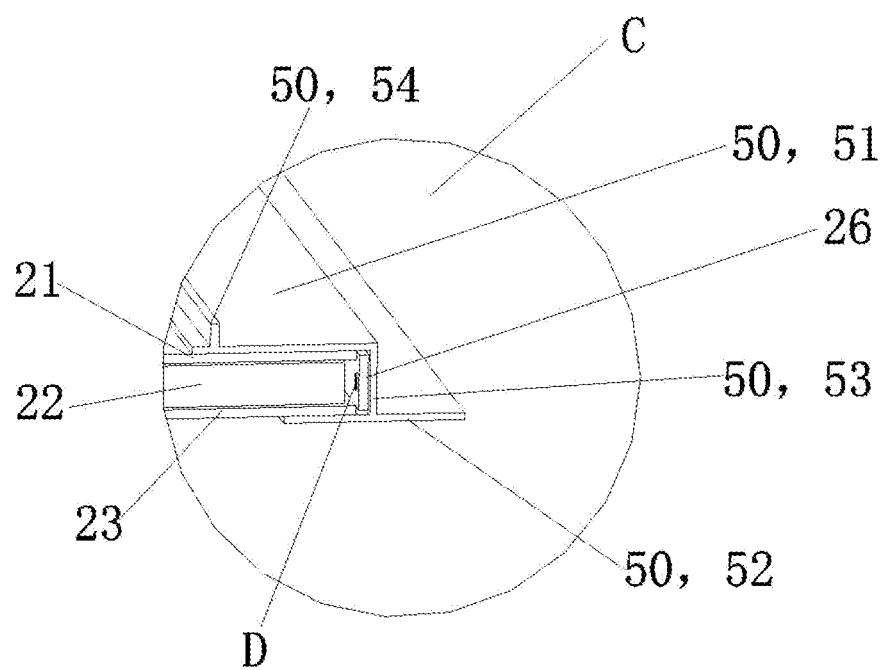
FIG. 10 is an enlarged view of part C in FIG. 9, in which D is an LED lamp bead on the LED light source plate 26.

In the embodiment as shown in FIG. 7 and FIG. 8, the replaceable LED lamp further comprises a lampshade 60 for covering the LED light source main body 20; the clamping piece 30 is a tailed-Z-shaped elastic sheet, comprising a clamping piece top face 31 for clamping the clamping piece 30 under the elastic structure 25, a clamping piece vertical face 32 for attaching the clamping piece 30 onto the LED light source main body 20, a clamping piece bottom face 33 for attaching the clamping piece 30 onto the mounting base grid 10 and the LED light source main body 20, and a clamping piece tail 34 clamped between the lampshade 60 and the mounting base grid 10, wherein, by means of the clamping piece vertical face 32 and the clamping piece bottom face 33, the clamping piece 30 is attached onto the LED light source main body 20 and the mounting base grid 10; by clamping the clamping piece top face 31 between the elastic sheet of the elastic structure 25 and the LED light source main body 20, the LED light source main body 20 is fixedly connected to the mounting base grid 10 via the clamping piece 30; and the clamping piece tail 34 makes the lampshade 60 fixedly connected to the mounting base grid 10 by being clamped between the lampshade 60 and the mounting base grid 10. The section of the clamping piece 30 is Z shaped or tailed-Z shaped, or may be in other shapes, only if elastic connection or fixing and convenient disassembly with the elastic structure 25 can be realized.

As shown in FIG. 1, the elastic sheet in the elastic structure 25 is shaped like an inverted U or V, one end of the elastic structure 25 is fixedly connected to the LED light source main body 20 and the other end thereof is used for clamping the clamping piece 30 onto the LED light source main body 20. The elastic structure 25 may be presented in an inverted U or V, also may be elastic sheets or elastic structures with other shapes, one end thereof is fastened on the LED light source main body 20, that is, on the bracket top face 51 of the profile bracket 50, via a fastener such as screw; the elastic structure 25 also may be integrated with the profile bracket top face 51 and fixed on the profile bracket 50.

As shown in FIG. 1, there are at least two groups of elastic structures 25, each of which has at least one elastic sheet respectively and is located on each side of the LED light source main body 20 respectively; there are at least two clamping pieces 30, the number of which is the same as the group number of elastic structures 25; each clamping piece 30 is clamped with one group of elastic structures 25.

As shown in FIG. 1, the replaceable LED lamp further comprises a lampshade 60 for covering the LED light source main body 20, and the lampshade 60 is fixedly connected to the mounting base grid 10.

As shown in FIG. 4, the LED light source main body 20 comprises a long-bar shaped profile bracket 50; the profile bracket of the LED light source main body is enclosed to form a structure having a plurality of side faces, at least one of which is used for mounting an LED light source plate. The profile bracket 50 may be enclosed to form a rectangular or hexagonal or other polygonal structure, and at least one of the side faces is used for mounting LED lamp beads. Of course, the profile bracket 50 also may be in other irregular shapes other than long-bar shape, for example, circular arc. The mounting base grid 10 is matched with the shape enclosed by the profile bracket 50 of the LED light source main body 20; the shapes of the mounting base grid 10 and the LED light source main body 20 may be a rectangle with four sides, or may be a triangle with three sides, or may be other regular or irregular polygonal structures with a plurality of side faces. Each side face of the profile bracket of the LED light source main body with side lighting is equipped with an LED light source plate 26 for lighting; specifically, it may be that four side faces are equipped with the LED light source plate 26, or may be that three side faces are equipped with the LED light source plate 26, or may be that two side faces are equipped with the LED light source plate 26, or may be that one side face is equipped with the LED light source plate 26. The number of the LED light source plate 26 to be mounted may be flexibly determined depending on actual lighting demands.

In actual practice, when it is needed to replace a lamp, following mounting steps are needed.

1. Take down the tube or LED lamp in an old lamp panel or lampshade of an old lamp.

2. Put an LED light source main body 20 and a clamping piece 30 between the old lamp panel or lampshade and the mounting base grid 10; electrically connect the LED light source main body 20; implement the fixed connection between the LED light source main body 20 and the mounting base grid 10 through the clamping fit between the clamping piece 30 and the elastic structure 25.

3. Push in the old lamp panel or lampshade, and mount the old lamp panel or lampshade on the mounting base grid 10 to finish mounting.

In Step 1, the old lamp may be an LED lamp or other non-LED lamps; the old lamp may reserve the original lampshade 60 and mounting base grid 10, that is to say, the lampshade 60 and mounting base grid 10 may be shared by the new and old LED lamps; in this way, the mounting of the new LED lamp becomes easy, and at the same time the sharing of parts saves the material cost.

The LED light source main body 20 having an elastic structure 25 is fit with the clamping pieces 30 on two sides thereof to mount the new LED lamp on the old mounting base grid 10, such that the new LED lamp realizes the function of being compatible with the old lamp.

The replaceable LED lamp disclosed in the present invention is designed with an elastic structure 25 on an LED light source main body and a clamping piece 30, such that a new LED lamp may be mounted without demounting the base of an old lamp; thus, the mounting of a new LED lamp on an old lamp base becomes simple and feasible, the operation is convenient and quick, and the labor cost of replacing the LED lamp is reduced; the design of the LED lamp structure improves the compatibility of mounting, and at the same time reduces the number of assembly parts of the new lamp and reduces the material cost of replacement of users.

The above are embodiments of the present invention merely and are not intended to limit the patent scope of the present invention. Any equivalent structures or equivalent process transformations made according to the description and accompanying drawings of the present invention or applied in other relevant technical fields directly or indirectly are intended to be included in the patent protection scope of the present invention.

What is claimed is:

1. A replaceable LED lamp,
comprising a mounting base grid for fixing the replaceable LED lamp on a mounting surface, an LED light source main body for lighting and illuminating, and a clamping piece; and
the clamping piece fixes the LED light source main body on the mounting base grid by clamping with an elastic structure fixed on the LED light source main body,
wherein
the clamping piece is an elastic sheet with a Z-shaped section, comprising a clamping piece top face for clamping the clamping piece under the elastic structure, a clamping piece vertical face for attaching onto the LED light source main body, and a clamping piece bottom face for attaching onto the mounting base and the LED light source main body; and
by means of the clamping piece vertical face and the clamping piece bottom face, the clamping piece is attached onto the LED light source main body and the mounting base grid;
and, by camping the clamping piece top face between the elastic sheet of the elastic structure and the LED light source main body, the LED light source main body is fixedly connected to the mounting base grid via the clamping piece.

2. The replaceable LED lamp according to claim 1, wherein,
the LED light source main body is an LED light source main body with side lighting, comprising a profile bracket enclosing the surrounding thereof and an LED light source plate equipped with LED lamp beads;
the profile bracket comprises a bracket top face, a bracket bottom face, and a bracket vertical face connecting the bracket top face and the bracket bottom face; one end of the elastic structure is fixed on the bracket top face; and
one side of the bracket bottom face and the bracket top face are up-down clamped to form a clamping groove to accommodate the LED light source plate; and another side of the bracket bottom face is attached onto the clamping piece.

3. The replaceable LED lamp according to claim 2, wherein the LED light source main body comprises a light guide plate, a light reflecting plate and a light diffusion plate that are clamped in the clamping groove in turn from top down; the light reflecting plate and the light diffusion plate are disposed on the upper and lower sides of the light guide plate respectively to reflect and diffuse the light of the LED light source respectively.

4. The replaceable LED lamp according to claim 1, wherein,
it further comprises a lampshade for covering the LED light source main body; the clamping piece is a tailed-Z-shaped elastic sheet, comprising a clamping piece top face for clamping the clamping piece under the elastic structure, a clamping piece vertical face for attaching the clamping piece onto the LED light source main body, a clamping piece bottom face for attaching the clamping piece onto the mounting base grid and the LED light source main body, and a clamping piece tail clamped between the lampshade and the mounting base grid;

by means of the clamping piece vertical face and the clamping piece bottom face, the clamping piece is attached onto the LED light source main body and the mounting base grid;

and, by clamping the clamping piece top face between the elastic sheet of the elastic structure and the LED light source main body, the LED light source main body is fixedly connected to the mounting base grid via the clamping piece; and the clamping piece tail makes the lampshade fixedly connected to the mounting base grid by being clamped between the lampshade and the mounting base grid.

5. The replaceable LED lamp according to claim 1, wherein an elastic sheet in the elastic structure is shaped like an inverted U or V, one end of the elastic structure is fixedly connected to the LED light source main body and the other end thereof is used for clamping the clamping piece onto the LED light source main body.

6. The replaceable LED lamp according to claim 1, wherein, there are at least two groups of elastic structures, each of which has at least one elastic sheet respectively and is located on each side of the LED light source main body respectively; and there are at least two clamping pieces, number of which is the same as the group number of elastic structures; and each clamping piece is clamped with one group of elastic structures.

7. The replaceable LED lamp according to claim 1, Wherein it further comprises a lampshade for covering the LED light source main body and the lampshade is fixedly connected to the mounting base grid.

* * * * *